US012696185B2

(12) United States Patent
Kweon et al.

(10) Patent No.: US 12,696,185 B2
(45) Date of Patent: *Jul. 28, 2026

(54) METHOD AND APPARATUS FOR DISCOVERING AND SELECTING NETWORK PROVIDING CONNECTIVITY FOR PROVISIONING USER SUBSCRIPTION DATA

(71) Applicant: Samsung Electronics Co., Ltd., Suwon-si (KR)

(72) Inventors: Kisuk Kweon, Suwon-si (KR); Sangsoo Jeong, Suwon-si (KR); Sangjun Moon, Suwon-si (KR); Jungshin Park, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,060

(22) Filed: Mar. 29, 2024

(65) Prior Publication Data

US 2024/0244516 A1     Jul. 18, 2024

Related U.S. Application Data

(63) Continuation of application No. 17/320,930, filed on May 14, 2021, now Pat. No. 11,968,616.

(30) Foreign Application Priority Data

May 21, 2020     (KR) ........................ 10-2020-0061200

(51) Int. Cl.
*H04W 76/00* (2018.01)
*H04W 8/00* (2009.01)
(Continued)

(52) U.S. Cl.
CPC ........... *H04W 48/18* (2013.01); *H04W 8/005* (2013.01); *H04W 8/20* (2013.01); *H04W 12/068* (2021.01); *H04W 76/11* (2018.02)

(58) Field of Classification Search
None
See application file for complete search history.

(56) References Cited

U.S. PATENT DOCUMENTS

2016/0142163 A1     5/2016  Sirotkin
2019/0289466 A1     9/2019  Conant et al.
(Continued)

FOREIGN PATENT DOCUMENTS

CN         110753346 A      2/2020
JP     WO2020204092     *   1/2019   ............ H04W 48/02
(Continued)

OTHER PUBLICATIONS

Huawei et al., New Solution UE onboarding and provisioning for SNPN subscription, Apr. 1, 2020.
(Continued)

*Primary Examiner* — Abdelillah Elmejjarmi
(74) *Attorney, Agent, or Firm* — Jefferson IP Law, LLP

(57) ABSTRACT

A method and apparatus for discovering and selecting a network that provides connectivity for transmitting user subscription data is provided. A user equipment (UE) in a wireless communication system includes a transceiver and at least one processor configured to identify preconfigured first information comprising a first list, the first list comprising at least one identifier (ID) of at least one network group providing an initial access to a non-public network (NPN), receive, from at least one base station via the transceiver, second information comprising at least one second list, the at least one second list comprising at least one ID of at least one network group which is supported by the at least one
(Continued)

base station and provides an initial access to the NPN, and select a network to be initially accessed from a network group corresponding to at least one ID included in the first list and the at least one second list, based on the first information and the second information.

20 Claims, 7 Drawing Sheets

(51) Int. Cl.

| | |
|---|---|
| *H04W 8/20* | (2009.01) |
| *H04W 12/06* | (2021.01) |
| *H04W 48/18* | (2009.01) |
| *H04W 76/11* | (2018.01) |

(56) References Cited

U.S. PATENT DOCUMENTS

| | | | |
|---|---|---|---|
| 2021/0297937 A1 | 9/2021 | Baek et al. | |
| 2022/0007274 A1 | 1/2022 | Jin et al. | |
| 2022/0116835 A1 | 4/2022 | Shih et al. | |
| 2022/0353798 A1* | 11/2022 | Yang | H04W 48/16 |
| 2023/0069252 A1* | 3/2023 | Zhu | H04W 48/16 |
| 2023/0156457 A1 | 5/2023 | Liu et al. | |

FOREIGN PATENT DOCUMENTS

| | | |
|---|---|---|
| KR | 10-2020-0019067 A | 2/2020 |
| WO | 2020/037086 A1 | 2/2020 |
| WO | 2020/081773 A1 | 4/2020 |
| WO | 2020/204092 A1 | 10/2020 |
| WO | 2022/216198 A1 | 10/2022 |

OTHER PUBLICATIONS

3GPP; TSG SA; Study on enhanced support of non-public networks (Release 17), Jan. 28, 2020.
Mediatek Inc., Correction to Access SNPN via PLMN, 82-2001520, Jan. 16, 2020.
International Search Report dated Sep. 2, 2021, issued in International Patent Application No. PCT/KR2021/006091.
Samsung, 2004257, KI #4, Sol #5: Update to clarify how the UE discovers and selects the onboarding network, S2-2004257, SA WG2 Meeting #139E, Electronic, Elbonia Jun. 1, 2020.
Extended European Search Report dated Jul. 24, 2023, issued in European Patent Application No. 21809328.4.
Huawei et al., New Solution UE onboarding and provisioning for SNPN subscription, S2-2000645, 3GPP TSG SA WG2 Meeting #136AH, Jan. 7, 2020.
Huawei et al., New Solution external authentication and authorization, S2-2000646, 3GPP TSG SA WG2 Meeting #136AH, Jan. 7, 2020.
Ericsson, Control Plane based solution to onboarding KI#4, S2-2000191, 3GPP TSG SA WG2 Meeting #136AH, Jan. 7, 2020.
Japanese Office Action dated Mar. 11, 2025, issued in Japanese Patent Application No. 2022-571371.
Chinese Office Action dated Apr. 23, 2025, issued in Chinese Patent Application No. 202180036578.0.
Korean Office Action dated Sep. 29, 2025, issued in Korean Patent Application No. 10-2020-0061200.
Chinese Office Action dated Dec. 10, 2025, issued in Chinese Patent Application No. 202180036578.0.

* cited by examiner

METHOD AND APPARATUS FOR DISCOVERING AND SELECTING NETWORK PROVIDING CONNECTIVITY FOR PROVISIONING USER SUBSCRIPTION DATA

CROSS-REFERENCE TO RELATED APPLICATION(S)

This application is a continuation application of prior application Ser. No. 17/320,930, filed on May 14, 2021, which is based on and claims priority under 35 U.S.C. 119(a) of a Korean patent application number 10-2020-0061200, filed on May 21, 2020, in the Korean Intellectual Property Office, the disclosure of which is incorporated by reference herein in its entirety.

BACKGROUND

1. Field

The disclosure relates to a communication system. More particularly, the disclosure relates to a method and apparatus for selecting a network that provides network connectivity for a terminal to receive subscription information in a non-public network (NPN).

2. Description of Related Art

To meet the soaring demands for wireless data traffic since commercialization of $4^{th}$ Generation (4G) communication systems, efforts have been made to develop improved $5^{th}$ Generation (5G) communication systems or pre-5G communication systems. For this reason, 5G communication systems or pre-5G communication systems are also called beyond-4G-network communication systems or post-long term evolution (LTE) systems.

It is considered that the 5G communication system will be implemented in millimeter wave (mm Wave) bands, e.g., 60 GHz bands, so as to accomplish higher data rates. In 5G communication systems, beamforming, massive multi-input multi-output (MIMO), full dimensional MIMO (FD-MIMO), an array antenna, analog beamforming, and large-scale antenna technologies have been discussed as ways of alleviating propagation path loss and increasing propagation distances in ultra-high frequency bands.

For system network improvement, in 5G communication systems, technologies such as evolved small cell, advanced small cell, cloud radio access network (RAN), ultra-dense network, device-to-device (D2D) communication, wireless backhaul, moving network, cooperative communication, coordinated multi-points (CoMPs), and interference cancellation have been developed.

In a 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

In the 5G system, support for various services has been considered when compared to existing 4G systems. For example, most representative services may include mobile ultra-wideband communication (enhanced mobile broadband (eMBB)) services, ultra-reliable and low-latency communication (URLLC) services, massive machine type communication (mMTC), next-generation broadcasting services (evolved multimedia broadcast/multicast services: eMBMS), etc. A system providing the URLLC service may be referred to as an URLLC system, and a system providing the eMBB service may be referred to as an eMBB system. The terms, the service and the system, may be used interchangeably.

The URLLC service is a newly considered service in the 5G system unlike the existing 4G system, and requires satisfaction with the conditions of ultra-reliability (e.g., a packet error rate of about $10^{-5}$) and low-latency (e.g., about 0.5 msec) in comparison to other services. To satisfy such strict requirements, the URLLC service needs to apply a transmission time interval (TTI) shorter than the eMBB service and various operation schemes using the TTI have been considered.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. To implement the IoT, various technological elements, such as sensing technology, wired/wireless communication and network infrastructure, service interface technology, and security technology, are required, and recently technologies related to sensor networks for connecting objects, machine to machine (M2M), machine type communication (MTC), and so forth have been researched.

Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing IT and various industries.

Thus, various attempts have been made to apply 5G communication systems to IoT networks. For example, 5G communication technology such as a sensor network, M2M, MTC, etc., has been implemented by a scheme such as beamforming, MIMO, array antennas, and so forth. The application of cloud radio access network (RAN) as a Big Data processing technology may also be an example of the convergence of 5G technology and IoT technology.

As various services have been provided owing to the development of mobile communication systems as described above, a scheme for efficiently using a non-public network (NPN) for providing such various services using a self-network in a place like a factory, a school, a company, etc. is required. The NPN may be classified into a standalone NPN (SNPN) and a public network integrated NPN (PN-INPN).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for effectively providing a service by using a non-public network (NPN) in a wireless communication system.

Another aspect of the disclosure is to provide a method and apparatus for efficiently selecting a network that is available to a terminal (or user equipment) in an NPN system.

Another aspect of the disclosure is to provide a method and apparatus for reducing consumption of a radio resource when a terminal (or user equipment) selects a network, in an NPN system.

Additional aspects will be set forth in part in the description which follows and, in part, will be apparent from the description, or may be learned by practice of the presented embodiments.

In accordance with an aspect of the disclosure, a user equipment (UE) in a wireless communication system is provided. The UE includes a transceiver and at least one processor configured to identify preconfigured first information including a first list, the first list including at least one identifier (ID) of at least one network group providing an initial access to a non-public network (NPN), receive, from at least one base station via the transceiver, second information including at least one second list, the at least one second list including at least one ID of at least one network group which is supported by the at least one base station and provides an initial access to the NPN, and select a network to be initially accessed from a network group corresponding to at least one ID included in the first list and the at least one second list, based on the first information and the second information.

In accordance with another aspect of the disclosure, a base station in a wireless communication system is provided. The base station includes a transceiver and at least one processor configured to transmit first information including a list via the transceiver, the list including at least one identifier (ID) of at least one network group which is supported by the base station and provides an initial access to a non-public network (NPN) and receive, from a user equipment (UE), via the transceiver a request for connection to one network of a network group corresponding to at least one ID included in the list.

In accordance with another aspect of the disclosure, a method performed by a user equipment (UE) in a wireless communication system is provided. The method includes identifying preconfigured first information including a first list, the first list including at least one identifier (ID) of at least one network group providing an initial access to a non-public network (NPN), receiving, from at least one base station, second information including at least one second list, the at least one second list including at least one ID of at least one network group which is supported by the at least one base station and provides an initial access to the NPN, and selecting one network to be initially accessed from a network group corresponding to at least one ID included in the first list and the at least one second list, based on the first information and the second information.

In accordance with another aspect of the disclosure, a method performed by a base station in a wireless communication system is provided. The method includes transmitting first information including a list, the list including at least one identifier (ID) of at least one network group which is supported by the base station and provides an initial access to a non-public network (NPN) and receiving, from a user equipment (UE), a request for connection to one network of a network group corresponding to at least one ID included in the list.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
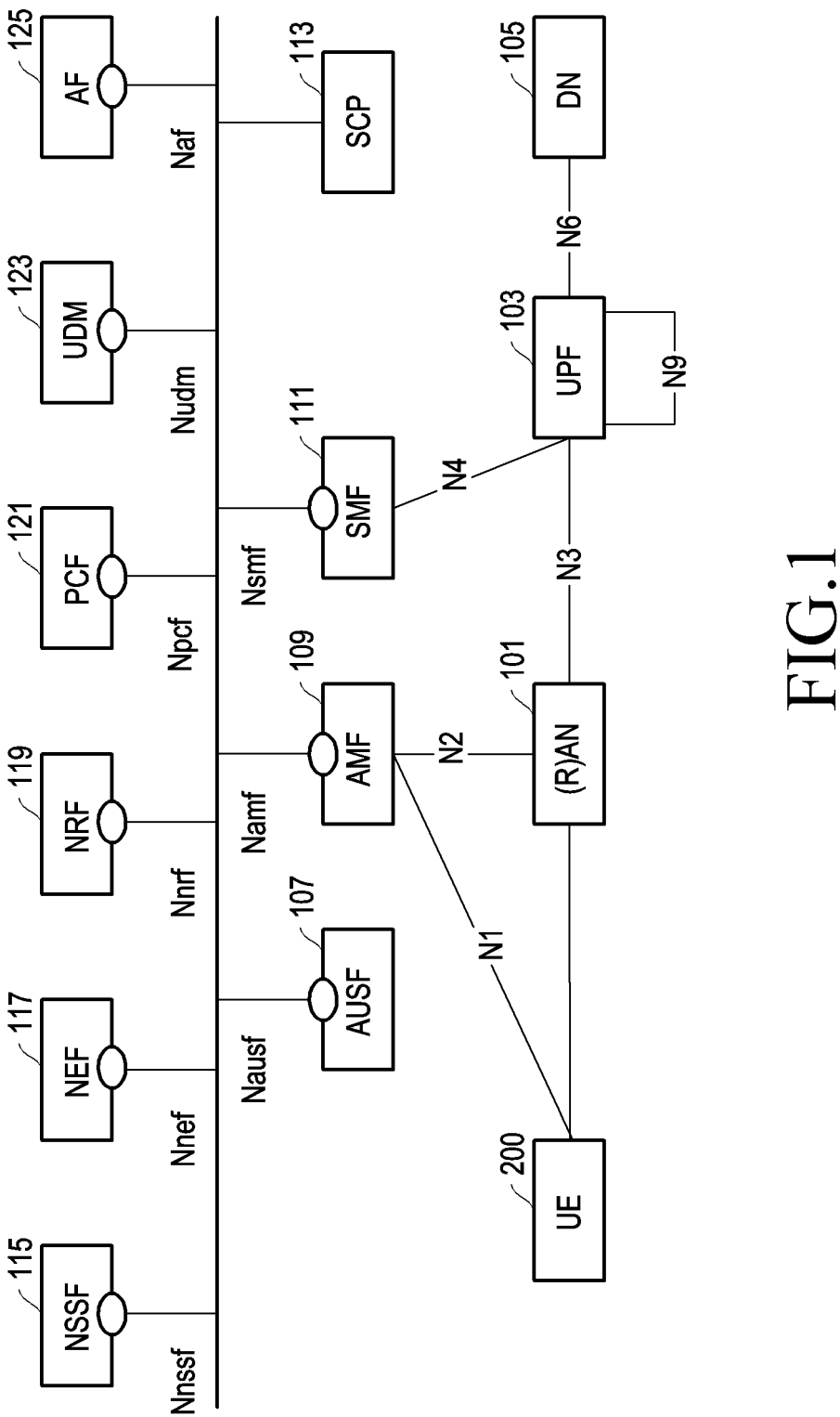
FIG. 1 illustrates a structure of a $5^{th}$ generation (5G) network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, when embodiments of the disclosure are described, technical matters that are well known in a technical field of the disclosure and are not directly related to the disclosure will not be described. By omitting an unnecessary description, the subject matter of the disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments described below together with the attached drawings. However, the disclosure is not limited to the disclosed embodiments, but may be implemented in various manners, and the embodiments are provided to complete the disclosure of the disclosure and to allow those of ordinary skill in the art to understand the scope of the disclosure. The disclosure is defined by the category of the claims. Throughout the specification, an identical reference numeral will indicate an identical element.

Meanwhile, it is known to those of ordinary skill in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operations to be performed on the computer or other programmable apparatus to produce a computer implemented process, such that the instructions that execute the computer or other programmable apparatus may provide operations for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

In the current embodiment, the term '-unit', as used herein, denotes a software or hardware component, such as a field programmable gate array (FPGA) or application specific integrated circuit (ASIC), which performs certain tasks. However, the meaning of '-unit' is not limited to software or hardware. For example, '-unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more CPUs in a device or a secure multimedia card.

Hereinbelow, the base station is an entity that performs resource assignment of the terminal, and may be at least one of Node B, a base station (BS), an evolved Node B (eNode B), gNode B (gNB), Node B, a wireless access unit, a base station controller, or a node on a network. The terminal may include a user equipment (UE), a mobile station (MS), a cellular phone, a smartphone, a computer, or a multimedia system capable of performing communication functions. In addition, embodiments of the disclosure may be applied to other communication systems having a technical background or channel form that is similar to the embodiments of the disclosure described below. Also, the embodiments of the disclosure may also be applied to other communication systems through some modifications within a range that does not largely depart from the scope of the disclosure based on determination of a skilled person.

As used in the following description, a term for identifying an access node, terms referring to network entities or network functions (NFs), terms referring to messages, a term referring to an interface between network objects, and terms referring to various identification information are illustrated for convenience of explanation. Therefore, the disclosure is not limited by the following terms, and other terms indicating targets having equivalent technical meanings may be used.

Hereinbelow, for convenience of a description, the disclosure may employ terms and names defined in the $3^{rd}$-Generation Partnership Project Long Term Evolution (3GPP LTE) standards and/or 3GPP New Radio (NR) standards. However, the disclosure is not limited by such terms and names, and may be equally applied to systems complying with other standards.

Embodiments of the disclosure disclose a scheme to reinforce session continuity of a terminal by providing a notification to a new application function (AF) in charge of a changed local data network (DN), i.e., a target AF, when a data network access identifier (DNAI) is changed due to occurrence of user plane function (UPF) relocation based on terminal movement and the local DN of the changed DNAI is changed. Hereinafter, the embodiments of the disclosure will be described with reference to the accompanying drawings.

FIG. 1 illustrates a structure of a 5G network according to an embodiment of the disclosure. A network entity or network nodes constituting a 5G network will be described as below.

A (radio (R)) access network (AN) 101 is an entity that performs radio resource assignment of the terminal (or user equipment), and may be at least one of eNode B, gNode B, Node B, a BS, a next-generation radio access network (NG-RAN), a 5G-AN, a wireless access unit, a base station controller, or a node on a network. The terminal may be at least one of a UE, an NG UE, an MS, a cellular phone, a smartphone, or a computer. The terminal may include a multimedia system capable of performing communication functions. While embodiments of the disclosure are described by using a 5G system as an example, the embodiments of the disclosure may also be applied to other communication systems having a similar technical background. Also, the embodiments of the disclosure may also be applied to other communication systems through some modifications within a range that does not largely depart from the scope of the disclosure based on determination of a skilled person.

As a wireless communication system evolves from a 4G system to a 5G system, a new core network, an NG core or a 5G core (5GC) network, will be defined. The new core network virtualizes existing network entities (NEs) to form a network function (NF).

According to embodiments of the disclosure, an NF may mean a network entity, a network component, and a network resource.

Referring to FIG. 1, according to an embodiment of the disclosure, a 5GC may include NFs. The 5GC is not limited to the illustration of FIG. 1, and may also include NFs that are more or less than the NFs illustrated in FIG. 1.

According to an embodiment of the disclosure, an access and mobility management function (AMF) 109 may be a network function that manages mobility of the terminal (or user equipment).

According to an embodiment of the disclosure, a session management function (SMF) 111 may be a network function that manages packet data network (PDN) connection provided to the terminal. Herein, PDN connection may be referred to as a protocol data unit (PDU) session.

According to an embodiment of the disclosure, a policy control function (PCF) 121 may be a network function that applies a service policy, a charging policy, and a PDU session policy of a mobile network operator for the terminal.

According to an embodiment of the disclosure, unified data management (UDM) 123 may be a network function that stores information for a subscriber.

According to an embodiment of the disclosure, an application function (AF) 125 may be an application function managed by a terminal manufacturer, a service provider, or a public land mobile network (PLMN) operator. However, the AF 125 may also mean other application functions in charge of a radio capability and a radio capability ID as well as the application function managed by the terminal manufacturer.

According to an embodiment of the disclosure, a service communication proxy (SCP) 113 may relay communication with an appropriate NF to NFs by serving as a proxy server in delivery of a 5G core service. According to an embodiment of the disclosure, a network exposure function (NEF) 117 may be a function that provides information about the terminal to a server outside a 5G network. The NEF may provide information required for a service to the 5G network to store the information in a unified data repository (UDR).

According to an embodiment of the disclosure, a user plane function (UPF) 103 may serve as a gateway that delivers a PDU to a DN.

According to an embodiment of the disclosure, a network repository function (NRF) 119 may function to discover an NF.

According to an embodiment of the disclosure, an authentication server function (AUSF) 107 may perform authentication with respect to a terminal on a 3GPP access network and a non-3GPP access network, According to an embodiment of the disclosure, a network slice selection function (NSSF) 115 may perform a function of selecting a network slice instance provided to the terminal.

According to an embodiment of the disclosure, a DN 105 may be a data network through which the terminal transmits or receives data to use a service of a network operator or a service of a 3rd party.

Figure 2:
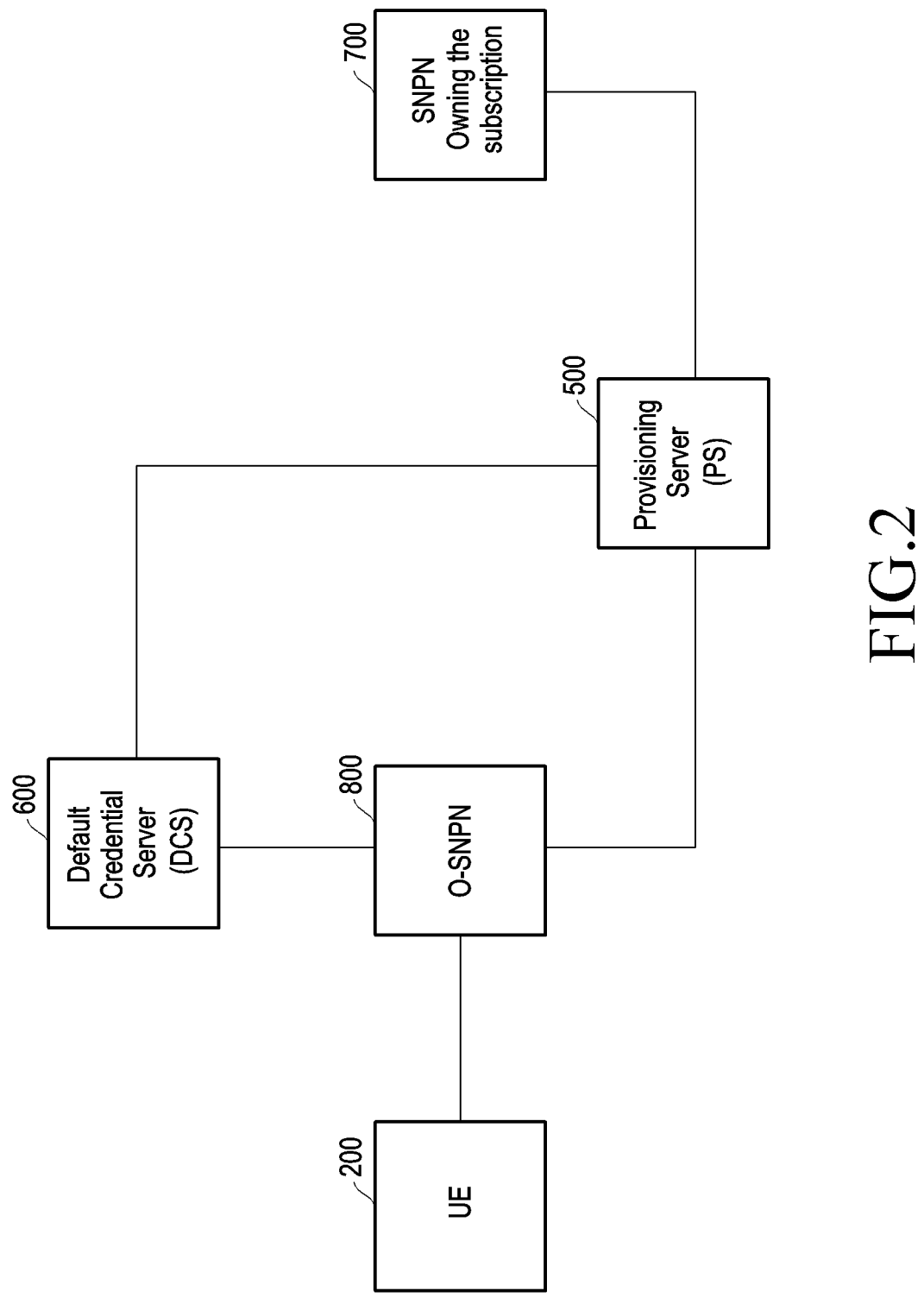
FIG. 2 illustrates entities for transmitting user subscription to a terminal (or user equipment (UE)) according to an embodiment of the disclosure.

FIG. 2 illustrates entities for transmitting user subscription to a terminal (or user equipment) according to an embodiment of the disclosure.

Referring to FIG. 2, a user equipment (UE) 200 may not have subscriber information or user subscription data. The UE is assumed to have default UE credentials assigned by a default credential server (DCS). In addition, the DCS may assign a unique UE identifier separately configured to identify the UE 200 to the UE 200. The UE 200 may be separately or simultaneously set to a PLMN network selection mode using a general network or an NPN network selection mode using an NPN, depending on network selection mode setting.

An onboarding standalone non-public network (O-SNPN) 800 may provide user plane (UP)-based Internet protocol (IP) connectivity (UE Onboarding) or control plane (CP)-based non-access stratum (NAS) connectivity to a UE having no subscriber information or user subscription data to allow the UE to download the user subscription data. Onboarding may mean that a device initially accesses to a network.

To determine whether to provide a UE onboarding service to the UE, a DCS may be requested to perform authentication for the UE.

A default credential server (DCS) 600 may pre-configure a default UE credential and a unique UE identifier for the UE 200 and store related information. The DCS 600 may be requested from the O-SNPN network 800 to perform authentication on the UE 200 when performing UE registration for onboarding. This authentication may be performed using a default UE credential. To determine whether the UE 200 is authorized to receive user subscription data when a provisioning server (PS) 500 transmits the user subscription data to the UE 200, the DCS 600 may be requested to perform authentication/authorization on the UE 200 from the PS 500. The DCS 600 may be a manufacturer of the UE 200 or a 3rd party related to the manufacturer or an SNPN operator.

The PS 500 may receive the user subscription data such as network credential and user configuration information from a network operator and transmits the received user subscription data to the UE 200. The PS 500 may exist as one server together with the DCS 600 and an ownership thereof may be a manufacturer of the UE 200 or a 3rd party related to the manufacturer or an SNPN operator like the DCS 600. Authentication/authorization with respect to the UE may be performed through communication with the DCS 600.

An SNPN network 700 owning the user subscription data may transmit the user subscription data to the UE 200 through the PS server 500. This network operator may have in advance identifier information of UEs that are to provide the user subscription data.

Figure 3:
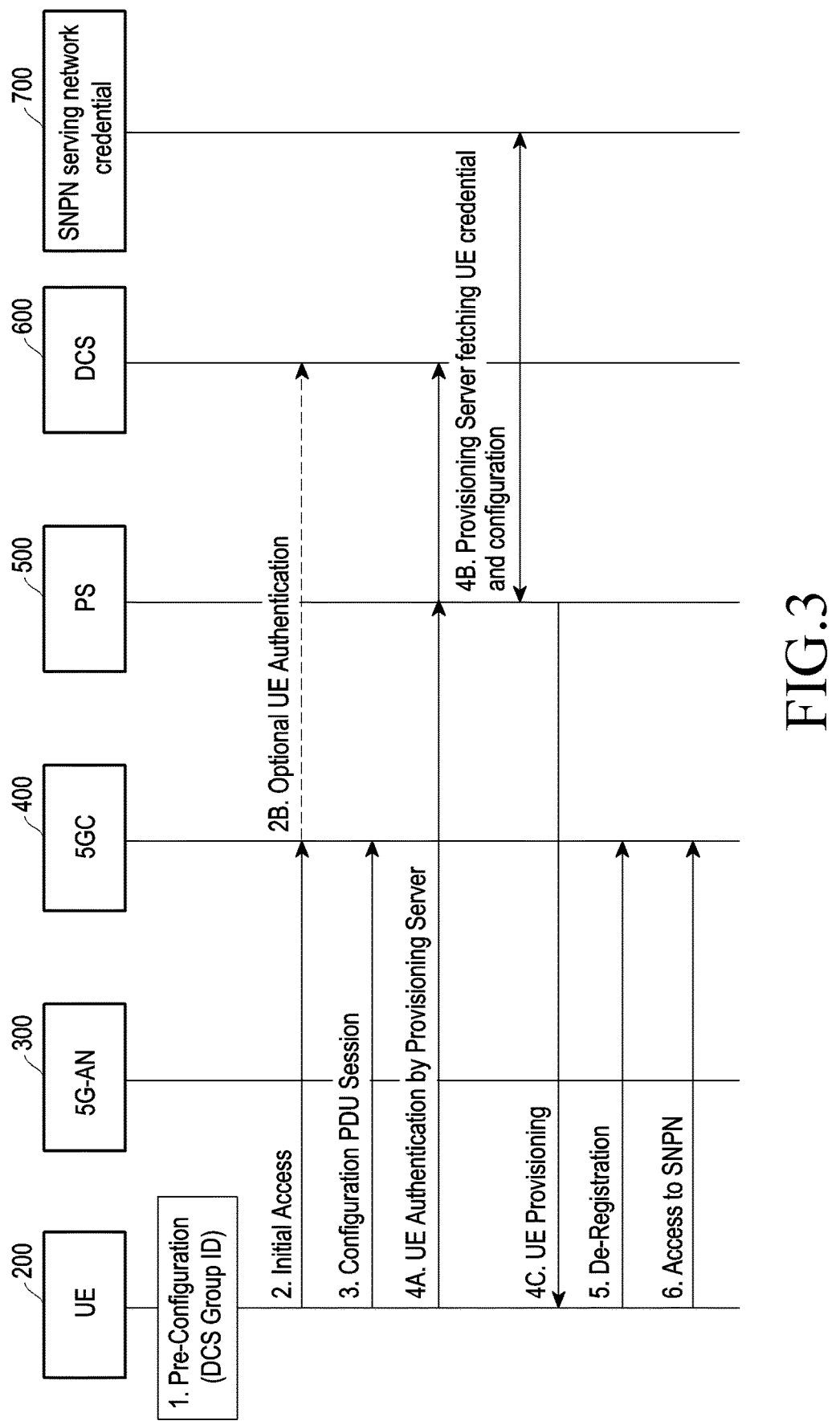
FIG. 3 illustrates a procedure for onboarding a terminal (or user equipment) for the terminal to receive user subscription data according to an embodiment of the disclosure.

FIG. 3 illustrates a procedure for onboarding a UE for the UE to receive the user subscription data according to an embodiment of the disclosure.

Referring to FIG. 3, a wireless communication system that executes a UE onboarding procedure may include a UE 200, a 5G-AN 300, a 5GC network 400, a PS 500, a DCS 600, and an SNPN network 700.

Herein, the 5G-AN 300 may perform radio resource assignment of the UE 200 and transmit system information to the UE 200. The 5GC network 400 may be implemented as an SNPN, and the SNPN network 700 may be implemented as a network (NPN or PLMN) owning the user subscriber information (network credential and configuration information).

At operation 1, the UE 200 may pre-configure a default UE credential and a unique UE ID assigned from the DCS 600. The UE 200 may include the following initial default configuration; a PLMN ID, a network information function (NIF) of the SNPN, a single network slice selection assistance information (S-NSSAI), a data network name (DNN), etc. In this case, the default UE credential may be configured by the UE 200, but the network credential may not be configured and may be provided to the UE 200 for the onboarding procedure.

The UE 200 may pre-configure a list of SNPN IDs including identifies of SNPN operators (SNPN IDs) contracting to provide onboarding with a manufacturer to select a network for providing onboarding. The SNPN ID may be configured in the form of PLMN ID+NID. Alternatively, the UE 200 may preconfigure a DCS group ID that is a group ID of the SNPN operators contracting to provide an onboarding service. The DCS group may be a group formed by prior agreement between the SNPN operators. The DCS group may be a group classified according to related types of business of SNPN operators or DCS server-owning operators. The DCS group ID may include a PLMN ID and an NID in the form of an SNPN ID, and may include at least one of location information, geographical information, or national code information (a mobile country code (MCC) or a mobile network code (MNC)). In an embodiment of the disclosure, the list of SNPN IDs or DCS GROUP IDs preconfigured in the UE 200 may be updated by the SNPN network.

At operation 2, the UE 200 may discover and select an O-SNPN network based on received broadcast system information. The UE 200 may transmit a unique UE identity and a default UE credential to the SNPN network because of absence of user subscription data regarding the SNPN network, in a network selection operation. The UE 200 may transmit information such as an application identifier or a service provider identifier.

At operation 2B, the 5G-AN 300 and the 5GC network 400 may transmit the unique UE identity and the default UE credential of the UE 200 to the DCS 600 that manages the UE 200 to request authentication regarding whether the UE is accessible to the network for onboarding. Such authentication may be performed by selecting one of primary authentication or network slice specific authentication and authorization (NSSAA).

At operation 3, the UE 200 may generate a configuration PDU session. This PDU session may be generated using well-known or preconfigured S-NSSAI/DNN or S-NSSAI/DNN information received from the DCS 600. The AMF may select an SMF designated for this end and the SMF may also select a designated PDU session anchor (PSA) UPF.

At operation 4A, information preconfigured in the UE may be used in an application level or the PS 500 may be discovered through an application identifier or a service provider identifier. The PS 500 may transmit the unique UE identifier and the default UE credential of the UE to the DCS 600 to authenticate the UE 200.

At operation 4B, the PS 500 may request and receive, from the SNPN network 700, not only network credentials for the future SNPN owning the subscription, but also user subscription data or other UE configuration parameters (e.g., PDU session parameters, such as S-NSSAI, DNN, URSPs, QoS rules, and other required parameters to access the SNPN and establish a regular PDU session).

At operation 4C, the PS 500 may transmit data received from the SNPN network 700 at operation 4B to the UE 200.

At operation 5, when the UE 200 successfully receives data at operation 4C, the UE 200 may disconnect a configuration PDU session of the onboarding network and perform deregistration.

At operation 6, the UE 200 may be registered in the serving network by using the received user subscription data to receive a network service. The onboarding network and the serving network may be the same as or different from each other.

Figure 4:
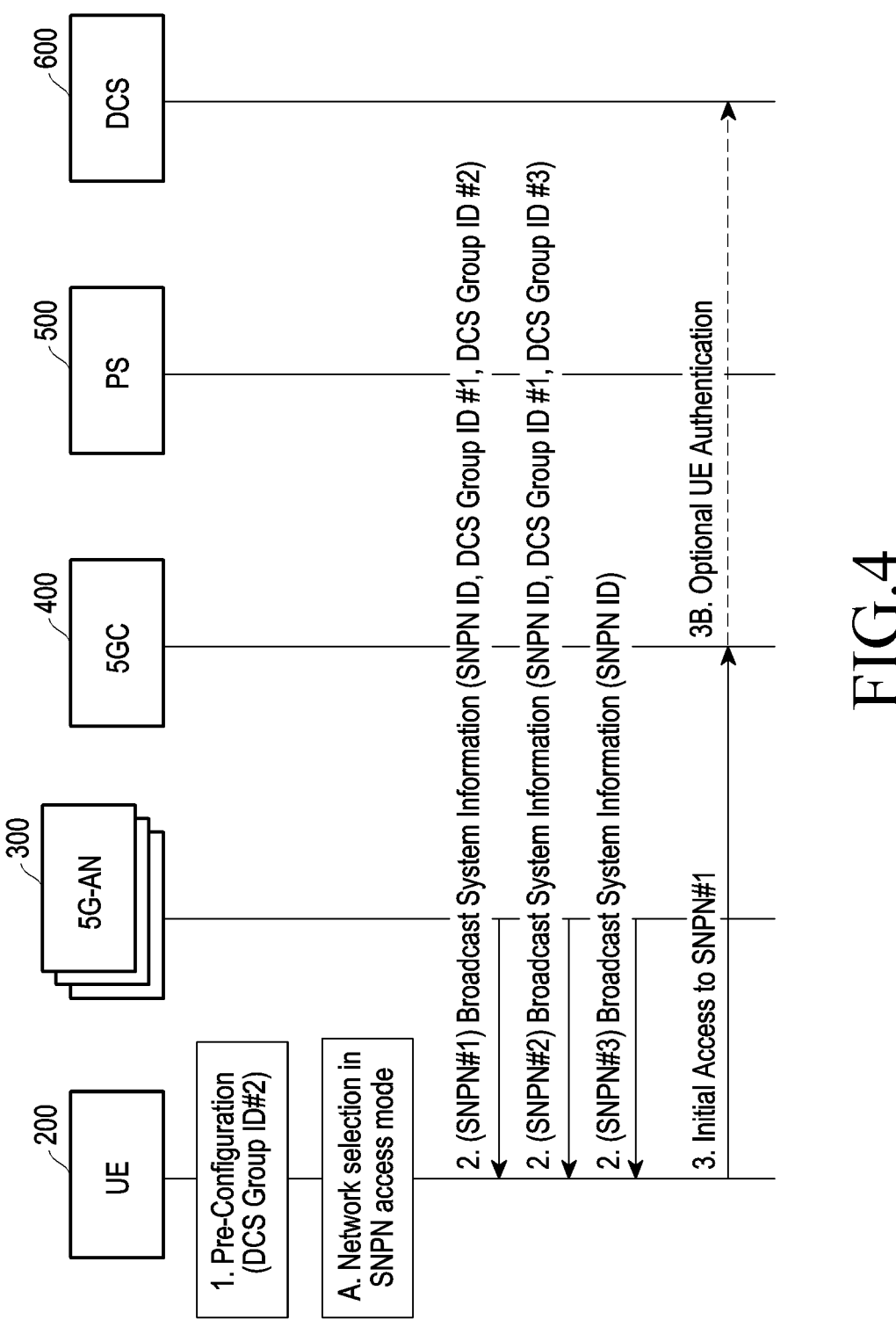
FIG. 4 illustrates a procedure for discovering and selecting a standalone non-public network (SNPN) for onboarding of a terminal (or user equipment) when a plurality of onboarding SNPN networks exist according to an embodiment of the disclosure.

FIG. 4 illustrates a procedure for discovering and selecting an SNPN network for onboarding of a UE when a plurality of onboarding SNPN networks exist according to an embodiment of the disclosure.

Referring to FIG. 4, at operation 1, a UE 200 may pre-configure a default UE credential and a unique UE ID assigned from a DCS 600. The UE 200 may include the following initial default configuration; a PLMN ID, an NIF of the SNPN, an S-NSSAI, a DNN, etc.

In this case, the default UE credential may be configured by the UE 200, but the network credential may not be configured and may be provided to the UE 200 as a for the onboarding procedure.

The UE 200 may pre-configure a list of SNPN IDs including identifies of SNPN operators (SNPN IDs) contracting to provide onboarding with a manufacturer to select a network for providing onboarding. The SNPN ID may be configured in the form of PLMN ID+NID. Alternatively, the UE 200 may preconfigure a list of DCS group IDs including a DCS group ID that is a group ID of SNPN operators contracting to provide the onboarding service or a plurality of DCS group IDs. The DCS group may be a group formed by prior agreement between the SNPN operators. The DCS group may be a group classified according to related types of business of SNPN operators or DCS server-owning operators. The DCS group ID may include a PLMN ID and an NID like an SNPN ID, and at least one of location information, geographical information, or national information (MCC or MNC). In an embodiment of the disclosure, the list of SNPN IDs or DCS group IDs preconfigured in the UE 200 may be updated by the SNPN network.

At operation A, the UE 200 may operate in an SNPN access mode to perform network selection. This is because the DCS group ID may have a form like the SNPN ID. When the DCS group ID has another form, the UE 200 may select an access mode that is different from the SNPN access mode.

At operation 2, in an embodiment shown in the current drawing, the 5G-AN 300 and the 5GC network 400 may broadcast not only its SNPN ID, but also a DCS group ID of a DCS group to which they belong, through broadcast system information. In the embodiment shown in the current drawing, SNPN #1 includes DCS group ID #2 preconfigured in the UE 200, such that the UE 200 may select SNPN #1 as an onboarding network.

At operation 3, the UE 200 may perform initial access for registration in the selected SNPN.

Thereafter, operations following operation 3B may be performed like operations of FIG. 3.

Figure 5:
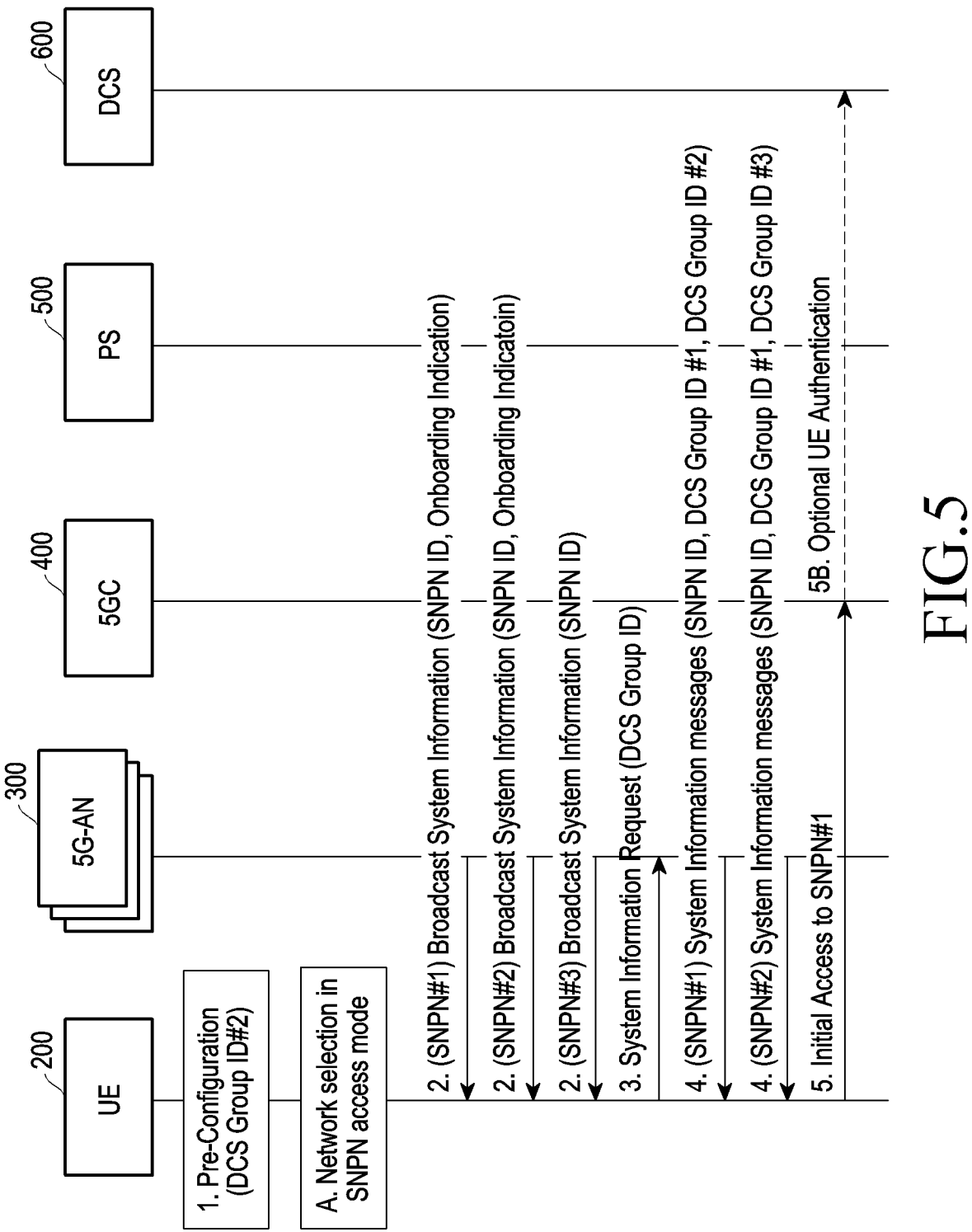
FIG. 5 illustrates a procedure for discovering and selecting a standalone non-public network (SNPN) for onboarding of a terminal when a plurality of onboarding SNPN networks exist according to an embodiment of the disclosure.

FIG. 5 illustrates a procedure for discovering and selecting an SNPN network for onboarding of a UE when a plurality of onboarding SNPN networks exist according to an embodiment of the disclosure.

Referring to FIG. 5, at operation 1, a UE 200 may be pre-configured a default UE credential and a unique UE ID assigned from a DCS 600. The UE 200 may include the following initial default configuration; a PLMN ID, an NIF of the SNPN, an S-NSSAI, a DNN, etc. In this case, the default UE credential may be configured by the UE 200, but the network credential may not be configured and may be provided to the UE 200 for the onboarding procedure.

The UE 200 may pre-configure a list of SNPN IDs including identifies of SNPN operators (SNPN IDs) contracting to provide onboarding with a manufacturer to select a network for providing onboarding. The SNPN ID may be configured in the form of PLMN ID+NID. Alternatively, the UE 200 may preconfigure a list of DCS group IDs including a DCS group ID that is a group ID of SNPN operators contracting to provide the onboarding service or a plurality of DCS group IDs. The DCS group may be a group formed by prior agreement between the SNPN operators. The DCS group may be a group classified according to related types of business of SNPN operators or DCS-owning operators. The DCS group ID may include a PLMN ID and an NID in the form of an SNPN ID, and may include at least one of location information, geographical information, or national code information (a mobile country code (MCC) or a mobile network code (MNC)). In an embodiment of the disclosure, the list of SNPN IDs or DCS GROUP IDs preconfigured in the UE 200 may be updated by the SNPN network. In an embodiment illustrated in the current drawing, the UE 200 may preconfigure DCS group ID #2.

At operation A, the UE 200 may operate in an onboarding mode to perform network selection. This is intended to receive and identify an onboarding indication from the SNPN network and to request a DCS group ID list. The onboarding indication may be information for indicating whether a base station supports network onboarding.

At operation 2, in an embodiment shown in the current drawing, the 5G-AN 300 and the 5GC network 400 may broadcast its SNPN ID and the onboarding indication indicating whether onboarding is supported, through broadcast system information. In an embodiment shown in the current drawing, the 5G-AN 300 and the 5GC network 400 may broadcast an onboarding indication indicating SNPN #1 and SNPN #2 support onboarding, through the broadcast system information.

At operation 3, the UE 200 performing network selection in the onboarding mode may request, through a system information request message, a list of DCS group IDs supported by the SNPN network from SNPN networks (SNPN #1 and SNPN #2) supporting onboarding based on the received onboarding indication.

At operation 4, each of SNPN #1 and SNPN #2 having received the system information request may transmit a DCS group ID supported by each SNPN or a list of DCS group IDs to the UE 200 through a system information message.

The UE 200 may identify a DCS group ID supported by an SNPN network from the received system information message and select one SNPN network including a DCS group ID preconfigured in the UE 200. When there are a plurality of SNPN networks including a DCS group ID preconfigured in the UE 200, the UE 200 may select an SNPN network based on priority information. The priority information may be preconfigured in the UE 200, and the UE may reflect and configure information included in a received signal.

In an embodiment of the current drawing, at operation 5, the UE 200 may perform initial access for registration in the selected SNPN #1.

Thereafter, operation 5B and operations following operation 5B may be performed like operations of FIG. 3.

Figure 6:
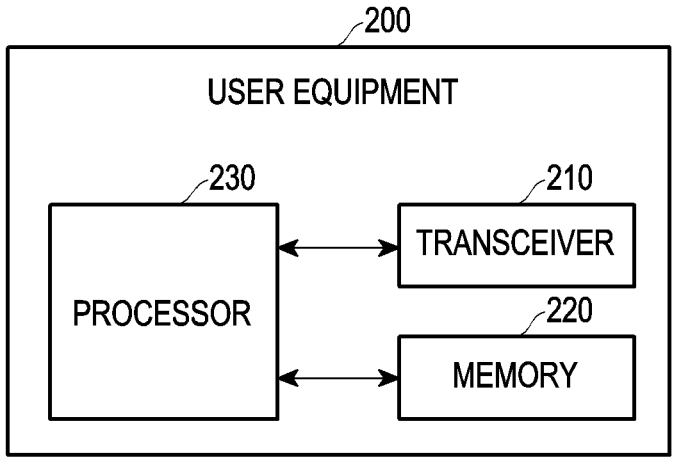
FIG. 6 illustrates a structure of a user equipment (UE) according to an embodiment of the disclosure.

FIG. 6 is a view for describing a structure of a UE according to an embodiment of the disclosure.

The UE 200 described above with reference to FIGS. 1 through 5 may correspond to the UE 200 of FIG. 6.

Referring to FIG. 6, a UE 200 may include a transceiver 210, a memory 220, and a processor 230. According to the above-described communication method of the UE 200, the transceiver 210, the processor 230, and the memory 220 of the UE 200 may operate. However, components of the UE 200 are not limited to the above-described example. For example, the UE 200 may include components that are more than or less than the above-described components. Moreover, the transceiver 210, the processor 230, and the memory 220 may be implemented in a single chip form. The processor 230 may include one or more processors.

The transceiver 210 may collectively refer to a receiver and a transmitter of the UE 200, and may transmit and receive a signal to and from a base station (e.g., the 5G-AN 300), an NF, the PS 500, the DCS 600, or other UEs. The signal transmitted and received to and from the base station, the NF, the PS, the DCS, or other UEs may include control information and data. To this end, the transceiver 210 may include an RF transmitter that up-converts and amplifies a frequency of a transmission signal and an RF signal that low-noise-amplifies a received signal and down-converts a frequency. However, this is merely an example of the transceiver 210, components of which are not limited to the RF transmitter and the RF receiver.

The transceiver 210 may receive a signal through a radio channel and output the received signal to the processor 230, and transmit a signal output from the processor 230 through the radio channel.

The memory 220 may store programs and data required for an operation of the terminal. The memory 220 may also store control information or data included in a signal obtained by the terminal. The memory 220 may include a storage medium such as read-only memory (ROM), random access memory (RAM), hard-disk, compact disc (CD)-ROM, digital versatile disk (DVD), etc., or a combination thereof. The memory 220 may not exist separately, and may be included in the processor 230.

The processor 230 may control a series of processes such that the UE operates according to the above-described embodiment of the disclosure. For example, the processor 230 may receive a control signal and a data signal through the transceiver 210 and process the received control signal and data signal. The processor 230 may transmit the processed control signal and data signal through the transceiver 210. The processor 230 may be provided in plural and may perform an operation of controlling components of the UE 200 by executing a program stored in the memory 220. The processor 230 may control the transceiver 210 and the memory 220 to operate according to an embodiment of the disclosure.

Figure 7:
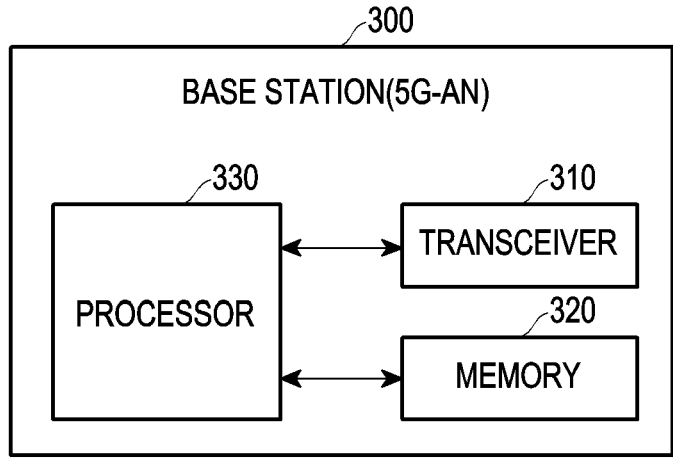
FIG. 7 illustrates a structure of a base station (a 5G-access network (AN)) according to an embodiment of the disclosure.

FIG. 7 is a view for describing a structure of a base station (5G-AN) according to an embodiment of the disclosure.

Operations of each of the SNPN network, the network entities, or the NFs described with reference to FIGS. 1 through 5 may be performed through a base station of FIG. 7.

Referring to FIG. 7, a base station (e.g., the 5G-AN 300) may include a transceiver 310, a memory 320, and a processor 330. According to the above-described communication method of the base station (e.g., the 5G-AN 300), the transceiver 310, the processor 330, and the memory 320 of the base station (e.g., the 5G-AN 300) may operate. However, components of the base station are not limited to the above-described example. For example, the base station may include components that are more than or less than the above-described components. Moreover, the transceiver 310, the processor 330, and the memory 320 may be implemented in a single chip form. The processor 330 may include one or more processors.

The transceiver 310 may collectively refer to a receiver and a transmitter of the base station (e.g., the 5G-AN 300), and may transmit and receive a signal to and from an NF, the PS 500, the DCS 600, the UE 200, or other base stations. The signal transmitted and received to and from the NF, the PS 500, the DCS 600, the UE 200, or other base stations may include control information and data. To this end, the transceiver 310 may include an RF transmitter that up-converts and amplifies a frequency of a transmission signal and an RF signal that low-noise-amplifies a received signal and down-converts a frequency. However, this is merely an example of the transceiver 310, components of which are not limited to the RF transmitter and the RF receiver.

The transceiver 310 may receive a signal through a radio channel and output the received signal to the processor 330, and transmit a signal output from the processor 330 through the radio channel.

The memory 320 may store programs and data required for an operation of the base station. The memory 320 may also store control information or data included in a signal obtained by the base station. The memory 320 may include a storage medium such as read-only memory (ROM), random access memory (RAM), hard-disk, compact disc (CD)-ROM, digital versatile disk (DVD), etc., or a combination thereof. The memory 320 may not exist separately, and may be included in the processor 330.

The processor 330 may control a series of processes such that the base station operates according to the above-described embodiment of the disclosure. For example, the processor 330 may receive a control signal and a data signal through the transceiver 310 and process the received control signal and data signal. The processor 330 may transmit the processed control signal and data signal through the transceiver 310. The processor 330 may be provided in plural and may perform an operation of controlling components of the base station (e.g., the 5G-AN 300) by executing a program stored in the memory 320.

According to an embodiment of the disclosure, the processor 330 may broadcast its SNPN ID, but also a DCS group ID of a DCS group to which the processor 330 belongs through broadcast system information and receive an initial access request for SNPN registration from the UE 200.

According to an embodiment of the disclosure, the processor 330 may broadcast its SNPN ID and an onboarding indication indicating whether onboarding is supported through the broadcast system information, receive a system information request message transmitted through the onboarding indication received by the UE 200 performing network selection, and transmit a DCS group ID supported by a network to which the processor 330 belongs or a list of DCS group IDs to the UE 200 through the system information message in response to the system information request.

Figure 8:
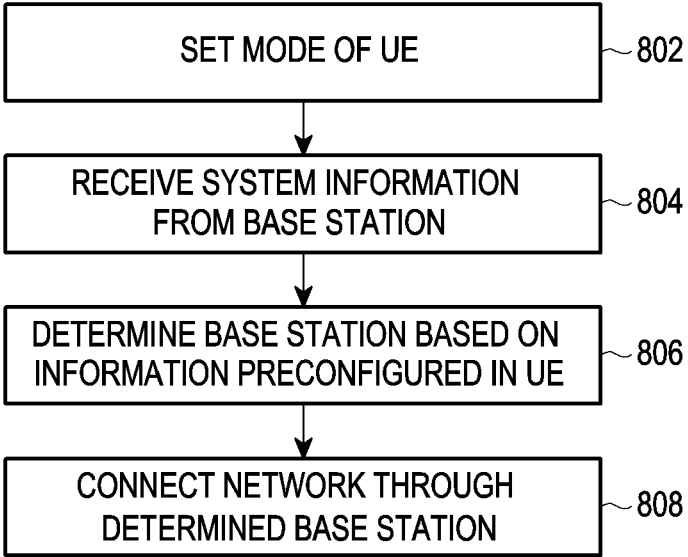
FIG. 8 illustrates a flowchart of a method of discovering and selecting a network by a terminal, according to an embodiment of the disclosure.

FIG. 8 illustrates a flowchart of a method of discovering and selecting a network by a UE according to an embodiment of the disclosure.

Referring to FIG. 8, at operation 802, a UE may perform configuration for an access mode. The access mode may be the PLMN access mode or the SNPN access mode. At operation 804, the UE 200 may receive system information from the base station (e.g., the 5G-AN 300). The system information may include any one of a PLMN ID or a DCS group ID. At operation 806, the UE 200 having received system information may determine the base station (e.g., the 5G-AN 300) based on information preconfigured in the UE 200. The preconfigured information may include at least one of a PLMN ID, a DCS group ID, a list of DCS group IDs, or an initial default configuration. At operation 808, the UE 200 may perform network connection through the determined base station (e.g., the 5G-AN 300).

The methods according to the embodiments of the disclosure described in the claims or specification of the disclosure may be implemented by hardware, software, or a combination thereof.

When the methods are implemented by software, a computer-readable storage medium having stored therein one or more programs (software modules) may be provided. The one or more programs stored in the computer-readable storage medium may be configured for execution by one or more processors in an electronic device. The one or more programs include instructions that cause the electronic device to execute the methods according to the embodiments described in the claims or the specification of the disclosure.

These programs (software modules and software) may be stored in RAMs, non-volatile memories including flash memories, ROMs, electrically erasable programmable ROMs (EEPROMs), magnetic disc storage devices, CD-ROMs, DVDs, other types of optical storage devices, or magnetic cassettes. The programs may be stored in a memory configured by a combination of some or all of such storage devices. Also, each memory may be provided in plurality.

The programs may be stored to an attachable storage device of the electronic device accessible via the communication network such as Internet, Intranet, a local area network (LAN), a wireless LAN (WLAN), or storage area network (SAN), or a communication network by combining the networks. The storage device may access a device performing the embodiment of the disclosure through an external port. Furthermore, a separate storage device in a communication network may access a device performing the embodiment of the disclosure.

In the detailed embodiments of the disclosure, components included in the disclosure have been expressed as singular or plural according to the provided detailed embodiment of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

While the disclosure has been shown and described with reference to various embodiments thereof, it will be understood by those skilled in the art that various changes in form and details may be made therein without departing from the spirit and scope of the disclosure as defined by the appended claims and their equivalents.

Further, the embodiments of the disclosure may be practiced in combination. For example, a base station and a UE may be managed by combining a part of an embodiment of the disclosure with a part of another embodiment of the disclosure. In addition, embodiments of the disclosure are also applicable to other communication systems, and other modifications based on the technical spirit of the embodiments may also be carried out in other communication systems.

What is claimed is:

1. A user equipment (UE) in a wireless communication system, the UE comprising:

a transceiver; one or more processors communicatively coupled to the transceiver; and memory, communicatively coupled to the one or more processors, storing instructions executable by the one or more processors individually or collectively to cause the UE to:

identify configuration information comprising at least one first group identifier (ID) of at least one group of servers for authorizing an access to a first standalone non-public network (SNPN), receive, from at least one base station, first system information including a public land mobile network identifier (PLMN ID), a network identifier (NID) and an indication related to onboarding for a second SNPN, wherein the PLMN ID and the NID are for identifying the second SNPN, receive, from the at least one base station, second system information including a first list comprising at least one second group ID of at least one group of servers for authorizing an access to the second SNPN, based on the indication, select the second SNPN, wherein the second SNPN corresponds to the configuration information comprising the at least one first group ID, and perform registration to the second SNPN.

2. The UE of claim 1, wherein the indication is broadcast, in case that onboarding is supported by the second SNPN.

3. The UE of claim 1, wherein the memory stores further instructions executable by the one or more processors individually or collectively to cause the UE to:

select the second SNPN based on the second system information.

4. The UE of claim 1, wherein the at least one first group ID is configured in a combination of a PLMN ID and an NID, and wherein the at least one second group ID is for supporting the onboarding.

5. The UE of claim 1, wherein priority information about at least one SNPN is preconfigured in the UE, and wherein a second list of the at least one first group ID and the preconfigured priority information are updated by a credential server.

6. A base station in a wireless communication system, the base station comprising:

a transceiver;

one or more processors communicatively coupled to the transceiver; and memory, communicatively coupled to the one or more processors, storing instructions executable by the one or more processors individually or collectively to cause the base station to:

transmit first system information including a public land mobile network identifier (PLMN ID), a network identifier (NID) and an indication related to onboarding for a first standalone non-public network (SNPN), wherein the PLMN ID and the NID are for identifying the first SNPN, transmit second system information including a first list comprising at least one first group identifier (ID) of at least one group of servers for authorizing an access to the first SNPN, and receive, from a user equipment (UE), a request for registration to the first SNPN, wherein the first SNPN corresponds to the indication and configuration information in the UE, wherein the configuration information comprises at least one second group ID of at least one group of servers for authorizing an access to a second SNPN.

7. The base station of claim 6, wherein the indication is broadcast, in case that onboarding is supported by the first SNPN.

8. The base station of claim 6, wherein priority information about at least one SNPN is preconfigured in the UE, wherein a second list of the at least one second group ID and the preconfigured priority information in the UE are updated by a credential server, and wherein the at least one first group ID is for supporting the onboarding.

9. The base station of claim 6, wherein the at least one first group ID is configured in a combination of a PLMN ID and an NID.

10. A method performed by a user equipment (UE) in a wireless communication system, the method comprising:

identifying configuration information comprising at least one first group identifier (ID) of at least one group of servers for authorizing an access to a first standalone non-public network (SNPN);

receiving, from at least one base station, first system information including a public land mobile network identifier (PLMN ID), a network identifier (NID) and an indication related to onboarding for a second SNPN, wherein the PLMN ID and the NID are for identifying the second SNPN;

receiving, from the at least one base station, second system information including a first list comprising at least one second group ID of at least one group of servers for authorizing an access to a second SNPN;

based on the indication, selecting the second SNPN, wherein the second SNPN corresponds to the configuration information comprising the at least one first group ID; and performing registration to the second SNPN.

11. The method of claim 10, wherein the indication is broadcast, in case that onboarding is supported by the second SNPN.

12. The method of claim 10, wherein selecting the second SNPN comprises selecting the second SNPN based on the second system information.

13. The method of claim 10, wherein the at least one first group ID is configured in a combination of a PLMN ID and an NID, and wherein the at least one second group ID is for supporting the onboarding.

14. The method of claim 10, wherein priority information about at least one SNPN is preconfigured in the UE, and wherein a second list of the at least one first group ID and the preconfigured priority information are updated by a credential server.

15. A method performed by a base station in a wireless communication system, the method comprising:

transmitting first system information including a public land mobile network identifier (PLMN ID), a network identifier (NID) and an indication related to onboarding for a first standalone non-public network (SNPN), wherein the PLMN ID and the NID are for identifying the first SNPN;

transmitting second system information including a first list comprising at least one first group identifier (ID) of at least one group of servers for authorizing an access to the first SNPN; and receiving, from a user equipment (UE), a request for registration to the first SNPN, wherein the first SNPN corresponds to the indication and configuration information in the UE, wherein the configuration information comprises at least one second group ID of at least one group of servers for authorizing an access to a second SNPN.

16. The method of claim 15, wherein the indication is broadcast, in case that onboarding is supported by the first SNPN.

17. The method of claim 15, wherein priority information about at least one SNPN is preconfigured in the UE, and wherein a second list of the at least one second group ID and the preconfigured priority information in the UE are updated by a credential server.

18. The method of claim 15, wherein the at least one first group ID is configured in a combination of a PLMN ID and an NID, and wherein the at least one first group ID is for supporting the onboarding.

19. The base station of claim 6, wherein the first SNPN corresponds to the information including the PLMN ID, the NID and the first list.

20. The method of claim 15, wherein the first SNPN corresponds to the information including the PLMN ID, the NID and the first list.

* * * * *